United States Patent
Kikuchi et al.

(10) Patent No.: US 8,098,484 B2
(45) Date of Patent: Jan. 17, 2012

(54) SOLID ELECTROLYTIC CAPACITOR AND METHOD FOR MANUFACTURING THE SAME

(75) Inventors: Kazuhito Kikuchi, Hirakata (JP); Mutsumi Yano, Hirakata (JP); Takashi Umemoto, Hirakata (JP); Hiroshi Nonoue, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 570 days.

(21) Appl. No.: 12/337,776

(22) Filed: Dec. 18, 2008

(65) Prior Publication Data

US 2009/0161297 A1   Jun. 25, 2009

(30) Foreign Application Priority Data

Dec. 19, 2007  (JP) ................. 2007-326750

(51) Int. Cl.
*H01G 9/14* (2006.01)
*H01G 9/15* (2006.01)
*H01G 9/004* (2006.01)

(52) U.S. Cl. .............. 361/532; 361/523; 361/528
(58) Field of Classification Search ........... 361/523, 361/532, 528; 29/25.03
See application file for complete search history.

(56) References Cited

U.S. PATENT DOCUMENTS

| | | | | |
|---|---|---|---|---|
| 3,293,507 A * | 12/1966 | Smith | | 361/518 |
| 3,466,508 A * | 9/1969 | Booe | | 361/536 |
| 3,828,227 A * | 8/1974 | Millard et al. | | 361/540 |
| 3,970,903 A * | 7/1976 | Shirn | | 361/533 |
| 4,090,288 A * | 5/1978 | Thompson et al. | | 29/25.03 |
| 4,203,194 A * | 5/1980 | McGrath | | 29/25.03 |
| 4,571,664 A * | 2/1986 | Hyland | | 361/540 |
| 4,660,127 A * | 4/1987 | Gunter | | 361/540 |
| 5,410,445 A * | 4/1995 | Kanetake | | 361/539 |
| 6,238,444 B1 * | 5/2001 | Cadwallader | | 29/25.03 |
| 6,970,345 B2 * | 11/2005 | Oh et al. | | 361/540 |
| 7,443,653 B2 * | 10/2008 | Kim et al. | | 361/523 |
| 7,570,480 B2 * | 8/2009 | Kim et al. | | 361/540 |
| 2003/0218858 A1 * | 11/2003 | Kim et al. | | 361/523 |
| 2004/0066607 A1 * | 4/2004 | Edson et al. | | 361/528 |
| 2005/0088805 A1 * | 4/2005 | Edson et al. | | 361/529 |
| 2006/0260109 A1 * | 11/2006 | Vaisman et al. | | 29/25.41 |
| 2006/0262489 A1 * | 11/2006 | Vaisman et al. | | 361/540 |
| 2007/0177333 A1 * | 8/2007 | Umemoto et al. | | 361/502 |
| 2007/0279841 A1 * | 12/2007 | Kim et al. | | 361/540 |
| 2008/0019081 A1 * | 1/2008 | Kim et al. | | 361/535 |
| 2008/0049381 A1 * | 2/2008 | Saida et al. | | 361/523 |
| 2008/0062617 A1 * | 3/2008 | Edson et al. | | 361/529 |
| 2008/0080124 A1 * | 4/2008 | Kim et al. | | 361/529 |
| 2009/0154065 A1 * | 6/2009 | Choi et al. | | 361/523 |
| 2009/0154066 A1 * | 6/2009 | Choi et al. | | 361/523 |
| 2009/0154068 A1 * | 6/2009 | Choi et al. | | 361/533 |

FOREIGN PATENT DOCUMENTS

EP   1863044 A1 * 12/2007
(Continued)

*Primary Examiner* — Anatoly Vortman
(74) *Attorney, Agent, or Firm* — Marvin A. Motsenbocker; Mots Law, PLLC

(57) ABSTRACT

Solid electrolytic capacitors are provided with decreased equivalent series resistance (ESR). The solid electrolytic capacitors include: an anode containing a valve metal or an alloy that is mainly made of a valve metal; a dielectric layer formed on a surface of the anode; an electrolyte layer formed on the dielectric layer; a carbon layer formed on the electrolyte layer; and a silver paste layer formed on the carbon layer, wherein the silver paste layer contains a nonionic surfactant.

8 Claims, 1 Drawing Sheet

FOREIGN PATENT DOCUMENTS

| | | |
|---|---|---|
| JP | 03-159222 A | 7/1991 |
| JP | 07094368 A * | 4/1995 |
| JP | 10-321471 A | 12/1998 |

* cited by examiner

SOLID ELECTROLYTIC CAPACITOR AND METHOD FOR MANUFACTURING THE SAME

CROSS REFERENCE TO RELATED APPLICATIONS

This application claims priority based on 35 USC 119 from prior Japanese Patent Application No. P2007-326750 filed on Dec. 19, 2007, entitled "Solid Electrolytic Capacitor", the entire contents of which are incorporated herein by reference.

BACKGROUND OF THE INVENTION

1. Field of the Invention

The present invention relates to a solid electrolytic capacitor and method for manufacturing the same.

2. Description of Related Art

Development of a solid electrolytic capacitor having small equivalent series resistance (ESR) in a high-frequency range has been recently desired as personal computers (PC) and the like have achieved higher performances.

A solid electrolytic capacitor is formed such that an anode made of a valve metal, such as tantalum or niobium, is anodized to form a dielectric layer mainly of oxide on an anode surface, an electrolyte layer is formed on the dielectric layer, and a cathode layer including a carbon layer and a silver paste layer is formed on the electrolyte layer (for example, see Japanese Patent Application Publication No. Hei 10-321471).

Japanese Unexamined Patent Application Publication No. Hei 3-159222 proposes that, to improve capacitance, tan δ and the like, a mixed layer of a surfactant and graphite is formed or a surfactant layer and a graphite layer are formed on a surface of an electrolyte layer.

However, as a result of the studies carried out by the inventors, it has been found that ESR cannot be sufficiently decreased even if such techniques are used.

SUMMARY OF THE INVENTION

An aspect of the invention provides a solid electrolytic capacitor that comprises: an anode containing any one of a valve metal and an alloy which is mainly made of a valve metal; a dielectric layer formed on a surface of the anode; an electrolyte layer formed on the dielectric layer; a carbon layer formed on the electrolyte layer; and a silver paste layer formed on the carbon layer, wherein the silver paste layer contains a nonionic surfactant.

In the solid electrolytic capacitor, the nonionic surfactant is contained in the silver paste layer. By including the nonionic surfactant in the silver paste layer, adhesiveness between silver particles in the silver paste layer can be increased. Furthermore, adhesiveness between the silver paste layer and the carbon layer can be increased. As a result, ESR can be greatly decreased.

In the solid electrolytic capacitor, preferably the nonionic surfactant in the silver paste layer is between 0.0005 weight % and 0.005 weight %. If the nonionic surfactant is less than 0.0005 weight % or exceeds 0.005 weight %, the adhesiveness between the silver particles is decreased and also the adhesiveness between the carbon layer and the silver paste layer is decreased. Accordingly, ESR cannot be sufficiently decreased in some cases.

In the solid electrolytic capacitor, preferably the molecular weight of the nonionic surfactant is not less than 400 and not more than 1200. If a nonionic surfactant of molecular weight less than 400 or more than 1200 is used, ESR cannot be sufficiently decreased in some cases. Note that, in the invention, the molecular weight means a number average molecular weight.

The nonionic surfactant for use in the solid electrolytic capacitor includes, for example, polyethylene glycol, polyglycerol, polyvinyl alcohol, polyethylene glycol alkyl ether, polyethylene glycol fatty ester, polyethylene glycol alkylthio ether, polyethylene glycol alkylphenol ether, polyethylene glycol alkyl amide, and the like. Above all, polyethylene glycol, polyglycerol, and polyvinyl alcohol are particularly preferably used. Accordingly, preferably the nonionic surfactant is at least one of polyethylene glycol, polyglycerol, and polyvinyl alcohol.

In the solid electrolytic capacitor, as a method for causing the nonionic surfactant to be contained in the silver paste layer, a method in which the nonionic surfactant is contained in the silver paste for forming the silver paste layer is preferable. The silver paste layer is formed by applying the silver paste containing the nonionic surfactant, so that the nonionic surfactant can be contained in the silver paste layer.

In the invention, a valve metal forming the anode is not limited as long as it can be used for a solid electrolytic capacitor. For example, the valve metal may include tantalum, niobium, titanium, aluminum, hafnium, zirconium, and the like. Above all, tantalum, niobium, and titanium, whose permittivity of oxide is high, are particularly preferable.

In addition, an alloy mainly made of a valve metal includes an alloy made of at least two kinds of valve metals, such as tantalum and niobium.

The dielectric layer may be formed by anodizing the anode. The anodization can be performed in, for example, a phosphoric acid solution or the like.

The electrolyte layer may be made of metal oxide, such as manganese dioxide, or conductive polymer, such as polypyrrole, polyethylenedioxythiophene, polythiophene, or polyaniline. The conductive polymer layer can be formed by, for example, a chemical polymerization method or the like.

The carbon layer according to the invention can be formed by, for example, applying a carbon paste and then drying it.

In addition, as described above, the silver paste layer according to the invention can be formed by applying the silver paste containing the nonionic surfactant and then drying it.

The carbon layer and the silver paste layer constitute the cathode layer.

Another aspect of the invention provides a method for manufacturing a solid electrolytic capacitor that comprises: forming an anode containing any one of a valve metal and an alloy that comprises mostly valve metal; forming a dielectric layer formed on a surface of the anode; forming an electrolyte layer formed on the dielectric layer; forming a carbon layer formed on the electrolyte layer; and forming a silver paste layer formed on the carbon layer, wherein the silver paste layer contains a nonionic surfactant.

According to the invention, by including the nonionic surfactant in the silver paste layer, the adhesiveness between silver particles in the silver paste layer can be increased. Furthermore, the adhesiveness between the carbon layer and the silver paste layer can be increased. As a result, ESR can be greatly decreased.

DETAILED DESCRIPTION OF EMBODIMENTS

Figure 1:
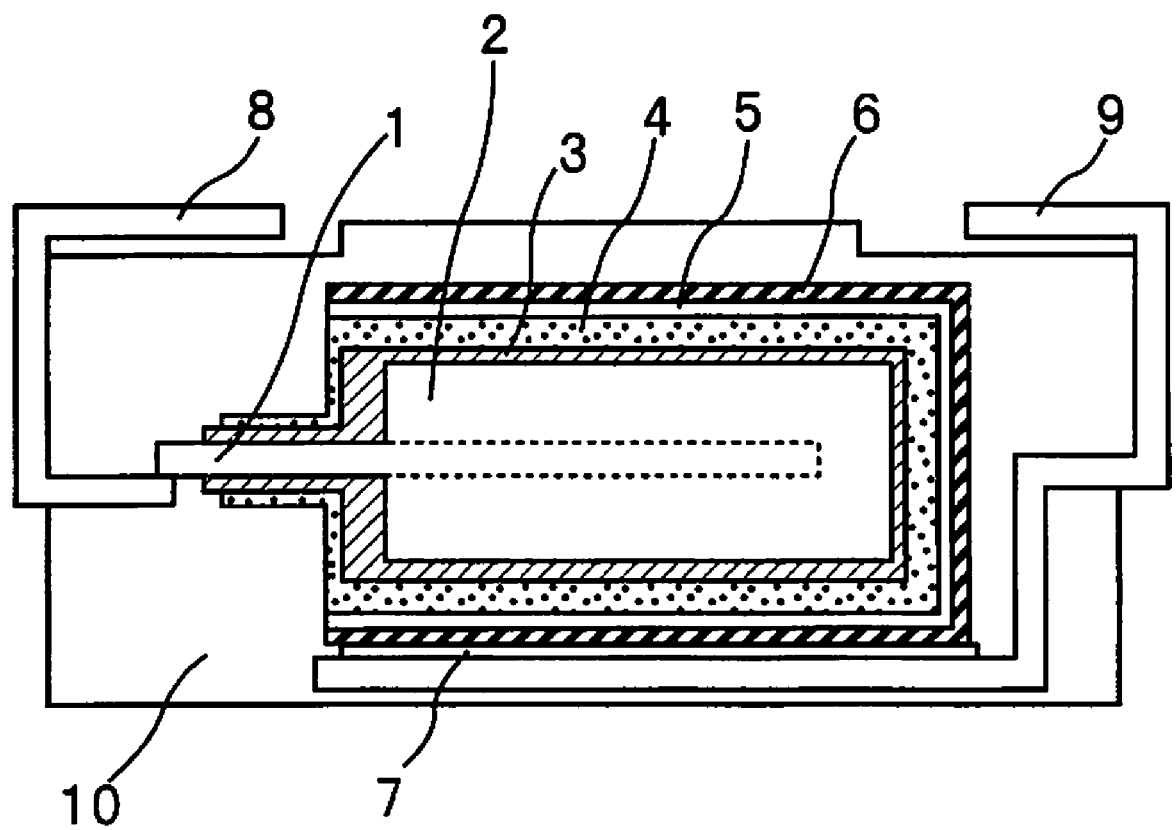
FIG. 1 is a schematic cross-sectional view showing a solid electrolytic capacitor according to an embodiment of the invention.

The present invention will be described below in more detail on the basis of an embodiment. However, the invention is not limited to the embodiment to be described below and can be implemented by being changed, as needed, without deviating from the gist of the invention.

Prepositions, such as "on", "over" and "above" may be defined with respect to a surface, for example a layer surface, regardless of that surface's orientation in space. The preposition "above" may be used in the specification and claims even if a layer is in contact with another layer. The preposition "on" may be used in the specification and claims when a layer is not in contact with another layer, for example, when there is an intervening layer between them.

FIG. 1 is a schematic cross-sectional view showing a solid electrolytic capacitor according to the embodiment of the invention. As shown in FIG. 1, anode lead 1 is buried in anode 2. Anode 2 is manufactured by molding and sintering valve metal powder. Dielectric layer 3 is formed on the surface of this anode 2. Dielectric layer 3 is also formed on the inner surface of anode 2, which is a porous body. Electrolyte layer 4 is formed on dielectric layer 3. Similar to dielectric layer 3, electrolyte layer 4 is also formed in the inside of anode 2.

Carbon layer 5 is formed on electrolyte layer 4 on the outer circumferential surface of anode 2, and silver paste layer 6 is formed thereon. The cathode layer includes carbon layer 5 and silver paste layer 6. The silver paste layer 6 has cathode terminal 9 connected thereto through conductive adhesive 7. In addition, anode lead 1 has anode terminal 8 connected thereto. Molded resin housing 10 is formed in such a manner that one end portion of each of anode terminal 8 and cathode terminal 9 is drawn to the outside thereof.

In the following examples, silver paste layer 6 contains a nonionic surfactant. By having nonionic surfactant in silver paste layer 6, not only is adhesiveness between silver particles in silver paste layer 6 increased, but also adhesiveness between carbon layer 5 and silver paste layer 6 is increased. As a result, ESR can be greatly improved.

In the following description, the solid electrolytic capacitor of the following examples will be described in detail. However, the invention is not limited to the examples to be described below and can be implemented by being changed, as needed, without deviating from the gist of the invention.

(Experiment 1)

Example 1

Step 1:
A silver paste is prepared by adding approximately 0.00095 weight % of polyethylene glycol with a mean molecular weight of 1000 to a silver paste containing approximately 20 weight % of epoxy resin, approximately 5 weight % of a curing agent, and approximately 5 weight % of N-vinylpyrrolidone as a solvent.

Step 2:
An anode made of a porous sintered body in which a tantalum metal lead is buried is formed by sintering tantalum powder with a mean particle diameter of approximately 2 μm at approximately 1400° C. This anode is immersed in 0.1 weight % of a phosphoric acid solution which is kept at 40° C., and is subjected to anodization at a constant voltage of 10 V for 10 hours, so that a dielectric layer made of tantalum oxide is formed on the surface of the anode.

Step 3:
Next, an electrolyte layer made of polypyrrole is formed on the anode prepared at step 2, by means of a chemical polymerization method or the like.

Step 4:
Next, a carbon layer is formed by applying a carbon paste onto the surface of the anode prepared at step 3 and drying it. Subsequently, a silver paste layer is formed by applying the silver paste prepared at step 1 onto this carbon layer and drying it at the temperature of 150° C. for 30 minutes. This silver paste layer is analyzed by using thermal decompression GC-MASS. As a result, it is observed that approximately 0.001 weight % of polyethylene glycol is contained in the silver paste layer.

Next, a cathode terminal is connected to the silver paste layer through a conductive adhesive, and an anode terminal is connected to a metal lead. Thereafter, they are covered by a mold resin, thereby forming solid electrolytic capacitor A1.

Comparative Example 1

Solid electrolytic capacitor X is prepared in a manner similar to example 1, except that a silver paste layer is formed by using a silver paste which does not contain polyethylene glycol at step 4 in example 1.

Comparative Example 2

Solid electrolytic capacitor Y is prepared in a manner similar to example 1, except that, at step 4 in example 1, a carbon layer is formed by applying, heating, and drying a carbon paste in which approximately 0.1 weight % of polyethylene glycol lauryl ether is contained, and thereafter a silver paste layer is formed by using a silver paste which does not contain a nonionic surfactant.

[ESR Measurements]

ESR of each of solid electrolytic capacitors A1, X, and Y according to the above-described example and comparative examples is measured at a frequency of 100 kHz with an LCR meter. Table 1 shows measurement results. Note that, values shown in table 1 are indices using the ESR value of solid electrolytic capacitor A1 as 100.

TABLE 1

|  | Additive in silver paste | ESR |
| --- | --- | --- |
| Solid electrolytic capacitor A1 | PEG | 100 |
| Solid electrolytic capacitor X | — | 170 |
| Solid electrolytic capacitor Y | — | 210 |

As is clear from the results shown in table 1, ESR is significantly improved in solid electrolytic capacitor A1 according to the invention in which the nonionic surfactant is contained in the silver paste layer.

In solid electrolytic capacitors X and Y, it is considered that ESR is high because the adhesiveness between the silver particles in the silver paste layer and the adhesiveness between the silver paste layer and the carbon layer are poor.

(Experiment 2)

Here, a relationship between the content of the nonionic surfactant and ESR is studied.

Examples 2 to 7

Solid electrolytic capacitors B1 to B6 are prepared in a manner similar to example 1, except that, at step 1 in example 1, silver pastes which respectively contain polyethylene glycol with amounts of approximately 0.000095 weight %, approximately 0.000238 weight %, approximately 0.000475 weight %, approximately 0.00475 weight %, approximately 0.00718 weight %, and approximately 0.0095 weight %, are prepared, and silver paste layers are formed with these silver pastes. Then, ESR is measured for each of the capacitors in a manner similar to example 1. Table 2 shows measurement results.

Note that, measured values shown in table 2 are indices using the ESR value of solid electrolytic capacitor A1 as 100.

The contents of polyethylene glycol in the silver paste layers prepared in the examples are analyzed by using the thermal decomposition GC-MASS. As a result, the respective contents are approximately 0.0001 weight %, approximately 0.00025 weight %, approximately 0.0005 weight %, approximately 0.005 weight %, approximately 0.0075 weight %, and approximately 0.01 weight %.

TABLE 2

| | Content of nonionic surfactant | ESR |
|---|---|---|
| Solid electrolytic capacitor B1 | Approximately 0.0001 weight % | 150 |
| Solid electrolytic capacitor B2 | Approximately 0.00025 weight % | 145 |
| Solid electrolytic capacitor B3 | Approximately 0.0005 weight % | 102 |
| Solid electrolytic capacitor A1 | Approximately 0.001 weight % | 100 |
| Solid electrolytic capacitor B4 | Approximately 0.005 weight % | 105 |
| Solid electrolytic capacitor B5 | Approximately 0.0075 weight % | 140 |
| Solid electrolytic capacitor B6 | Approximately 0.01 weight % | 150 |

As is clear from the results shown in table 2, the effect of reducing ESR is particularly large when the content of the nonionic surfactant in the silver paste layer is in a range between approximately 0.0005 weight % and approximately 0.005 weight %.

(Experiment 3)

Here, a relationship between a kind of the nonionic surfactant and ESR is studied.

Example 8

Solid electrolytic capacitor C1 is prepared in a manner similar to example 1, except that, at step 1 in example 1, a silver paste containing approximately 0.00095 weight % of polyglycerol (PG) with a mean molecular weight of 1000, in place of polyethylene glycol, is prepared, and a silver paste layer is formed with this silver paste.

Note that, the content of polyglycerol in the silver paste layer is approximately 0.001 weight % as a result of an analysis using the thermal decomposition GC-MASS.

Example 9

Solid electrolytic capacitor C2 is prepared in a manner similar to example 1, except that, at step 1 in example 1, a silver paste containing approximately 0.00095 weight % of polyvinyl alcohol (PVA) with a mean molecular weight of 1000, in place of polyethylene glycol, is prepared, and a silver paste layer is formed with this silver paste.

Note that, the content of polyvinyl alcohol in the silver paste layer is approximately 0.001 weight % as a result of an analysis using the thermal decomposition GC-MASS.

Example 10

Solid electrolytic capacitor C3 is prepared in a manner similar to example 1, except that, at step 1 in example 1, a silver paste containing approximately 0.000475 weight % of polyethylene glycol with a mean molecular weight of 1000 and approximately 0.000475 weight % of polyglycerol with a mean molecular weight of 1000 is prepared, and a silver paste layer is formed with this silver paste.

Note that, the contents of polyethylene glycol and polyglycerol in the silver paste layer are respectively approximately 0.0005 weight % and approximately 0.0005 weight % as a result of an analysis using the thermal decomposition GC-MASS.

Example 11

Solid electrolytic capacitor C4 is prepared in a manner similar to example 1, except that, at step 1 in example 1, a silver paste containing approximately 0.00095 weight % of polyethylene glycol monooleyl ether (PEGMOE) with a mean molecular weight of 1000, in place of polyethylene glycol, is prepared, and a silver paste layer is formed with this silver paste.

Note that, the content of polyethylene glycol monooleyl ether in the silver paste layer is approximately 0.001 weight % as a result of an analysis using the thermal decomposition GC-MASS.

Example 12

Solid electrolytic capacitor C5 is prepared in a manner similar to example 1, except that, at step 1 in example 1, a silver paste containing approximately 0.00095 weight % of polyethylene glycol monolauryl ether (PEGMLE) with a mean molecular weight of 1000, in place of polyethylene glycol, is prepared, and a silver paste layer is formed with this silver paste.

Note that, the content of polyethylene glycol monolauryl ether in the silver paste layer is approximately 0.001 weight % as a result of an analysis using the thermal decomposition GC-MASS.

Example 13

Solid electrolytic capacitor C6 is prepared in a manner similar to example 1, except that, at step 1 in example 1, a silver paste containing approximately 0.00095 weight % of polyethylene glycol monostearate (PEGMS) with a mean molecular weight of 1000, in place of polyethylene glycol, is prepared, and a silver paste layer is formed by using this silver paste.

Note that, the content of polyethylene glycol monostearate is approximately 0.001 weight % as a result of an analysis using the thermal decomposition GC-MASS.

[ESR Measurements]

ESR of each of solid electrolytic capacitors C1 to C6 according to the above-described examples is measured in a manner similar to example 1. Table 3 shows measurement results. Note that, table 3 also shows the value of solid electrolytic capacitor A1. The measured values shown in table 3 are indices using the ESR value of solid electrolytic capacitor A1 as 100.

TABLE 3

| | Kind of nonionic surfactant | ESR |
|---|---|---|
| Solid electrolytic capacitor A1 | PEG | 100 |
| Solid electrolytic capacitor C1 | PG | 101 |
| Solid electrolytic capacitor C2 | PVA | 101 |
| Solid electrolytic capacitor C3 | PEG + PG | 99 |
| Solid electrolytic capacitor C4 | PEGMOE | 125 |
| Solid electrolytic capacitor C5 | PEGMLE | 130 |
| Solid electrolytic capacitor C6 | PEGMS | 135 |

As is clear from the results shown in table 3, it can be observed that the ESR value can be decreased by containing various kinds of nonionic surfactants in the silver paste layer. In particular, it can be observed that ESR can be significantly decreased when polyethylene glycol, polyglycerol, and polyvinyl alcohol are used.

(Experiment 4)

Here, a relationship between a molecular weight of the nonionic surfactant and ESR is studied.

Examples 14 to 22

Here, as shown in table 4, solid electrolytic capacitors D1 to D9 are prepared in a manner similar to example 1, except that polyethylene glycols having different mean molecular weights are used as nonionic surfactants to form silver paste layers. Then, ESR of each of solid electrolytic capacitors D1 to D9 is measured in a manner similar to example 1. Table 4 shows measurement results.

Note that, table 4 also shows the measured value of solid electrolytic capacitor A1. In addition, the ESR values are indices using the ESR value of solid electrolytic capacitor A1 as 100.

Note that, the content of polyethylene glycol in the silver paste layer in each of the examples is approximately 0.001 weight % as a result of an analysis using the thermal decomposition GC-MASS.

Examples 23 to 31

Here, as shown in table 5, solid electrolytic capacitors E1 to E9 are prepared in a manner similar to example 1, except that polyglycerols having different mean molecular weights are used as nonionic surfactants to form silver paste layers. Then, ESR of each of solid electrolytic capacitors E1 to E9 is measured in a manner similar to example 1. Table 5 shows measurement results.

Note that, table 5 also shows the measured value of solid electrolytic capacitor C1, and the ESR values are indices using the ESR value of solid electrolytic capacitor A1 as 100.

Note that, the content of polyglycerol in the silver paste layer in each of the examples is approximately 0.001 weight % as a result of an analysis using the thermal decomposition GC-MASS.

Examples 32 to 46

Here, as shown in table 6, solid electrolytic capacitors F1 to F9 are prepared in a manner similar to example 1, except that polyvinyl alcohols having different mean molecular weights are used as nonionic surfactants to form silver paste layers. Then, ESR of each of solid electrolytic capacitors F1 to F9 is measured in a manner similar to example 1. Table 6 shows measurement results.

Note that, table 6 also shows the measured value of solid electrolytic capacitor C2. In addition, the ESR values are indices using the ESR value of solid electrolytic capacitor A1 as 100.

Note that, the content of polyvinyl alcohol in the silver paste layer in each of the examples is approximately 0.001 weight % as a result of an analysis using the thermal decomposition GC-MASS.

TABLE 4

| | Mean molecular weight of polyethylene glycol | ESR |
|---|---|---|
| Solid electrolytic capacitor D1 | 100 | 135 |
| Solid electrolytic capacitor D2 | 200 | 130 |
| Solid electrolytic capacitor D3 | 300 | 128 |
| Solid electrolytic capacitor D4 | 400 | 102 |
| Solid electrolytic capacitor D5 | 600 | 101 |
| Solid electrolytic capacitor D6 | 800 | 101 |
| Solid electrolytic capacitor A1 | 1000 | 100 |
| Solid electrolytic capacitor D7 | 1200 | 101 |
| Solid electrolytic capacitor D8 | 1400 | 130 |
| Solid electrolytic capacitor D9 | 1600 | 135 |

TABLE 5

| | Mean molecular weight of polyglycerol | ESR |
|---|---|---|
| Solid electrolytic capacitor E1 | 100 | 132 |
| Solid electrolytic capacitor E2 | 200 | 129 |
| Solid electrolytic capacitor E3 | 300 | 127 |
| Solid electrolytic capacitor E4 | 400 | 104 |
| Solid electrolytic capacitor E5 | 600 | 104 |
| Solid electrolytic capacitor E6 | 800 | 103 |
| Solid electrolytic capacitor C1 | 1000 | 101 |
| Solid electrolytic capacitor E7 | 1200 | 102 |
| Solid electrolytic capacitor E8 | 1400 | 132 |
| Solid electrolytic capacitor E9 | 1600 | 133 |

TABLE 6

| | Mean molecular weight of polyvinyl alcohol | ESR |
|---|---|---|
| Solid electrolytic capacitor F1 | 100 | 134 |
| Solid electrolytic capacitor F2 | 200 | 130 |

TABLE 6-continued

| | Mean molecular weight of polyvinyl alcohol | ESR |
|---|---|---|
| Solid electrolytic capacitor F3 | 300 | 128 |
| Solid electrolytic capacitor F4 | 400 | 102 |
| solid electrolytic capacitor F5 | 600 | 102 |
| Solid electrolytic capacitor F6 | 800 | 102 |
| Solid electrolytic capacitor C2 | 1000 | 101 |
| Solid electrolytic capacitor F7 | 1200 | 102 |
| Solid electrolytic capacitor F8 | 1400 | 130 |
| Solid electrolytic capacitor F9 | 1600 | 134 |

As is clear from the results shown in tables 4 to 6, it can be observed that ESR decreases significantly when a nonionic surfactant with a molecular weight of not less than 400 and not more than 1200 is used. Accordingly, it can be seen that it is preferable to use a nonionic surfactant with a molecular weight of not less than 400 and not more than 1200.

In the above-described examples, a conductive polymer layer using polypyrrole is formed as the electrolyte layer. However, an electrolyte layer may be formed by using another conductive polymer layer made of polyethylenedioxythiophene, polythiophene, polyaniline, or the like.

In sum, according to the embodiments described above, a solid electrolytic capacitor achieving a decrease in equivalent series resistance (ESR) can be provided.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A solid electrolytic capacitor, comprising:
   an anode containing any one of a valve metal and an alloy that comprises mostly valve metal;
   a dielectric layer formed on a surface of the anode;
   an electrolyte layer formed on the dielectric layer;
   a carbon layer formed on the electrolyte layer; and
   a silver paste layer formed on the carbon layer,
   wherein the silver paste layer contains a nonionic surfactant.

2. The capacitor of claim 1, wherein the silver paste layer contains between 0.0005 weight % and 0.005 weight %, inclusive of nonionic surfactant.

3. The capacitor of claim 1, wherein the nonionic surfactant is at least one of polyethylene glycol, polyglycerol and polyvinyl alcohol.

4. The capacitor of claim 3, wherein the nonionic surfactant has a molecular weight of between 400 and 1200, inclusive.

5. The capacitor of claim 1, wherein the nonionic surfactant is at least one of polyethylene glycol, polyglycerol, polyvinyl alcohol, polyethylene glycol alkyl ether, polyethylene glycol fatty ester, polyethylene glycol alkylthio ether, polyethylene glycol alkylphenol ether, and polyethylene glycol alkyl amide.

6. The capacitor of claim 1, wherein the anode includes, as a valve metal, at least one of tantalum, niobium, titanium, aluminum, hafnium, and zirconium.

7. The capacitor of claim 1, wherein the electrolyte layer is made of metal oxide including manganese dioxide.

8. The capacitor of claim 1, wherein the electrolyte layer is made of conductive polymer including polypyrrole, polyethylenedioxythiophene, polythiophene, or polyaniline.

* * * * *